United States Patent [19]

Suitch et al.

[11] Patent Number: 5,068,276

[45] Date of Patent: Nov. 26, 1991

[54] CHEMICALLY AGGREGATED MINERAL PIGMENTS

[75] Inventors: Paul R. Suitch, Milledgeville; A. Taylor Coppage, Macon; Alan J. Brown, Milledgeville, all of Ga.

[73] Assignee: E.C.C. America Inc., Atlanta, Ga.

[21] Appl. No.: 459,093

[22] Filed: Dec. 29, 1989

[51] Int. Cl.$^5$ ................................................ C08J 3/14
[52] U.S. Cl. .................................... 524/413; 524/425; 524/447
[58] Field of Search ..................... 524/447, 425, 413

[56] References Cited

U.S. PATENT DOCUMENTS 3,032,431  5/1962  Ferrigno ............................. 524/447
4,775,420 10/1988  Gonnet et al. .

FOREIGN PATENT DOCUMENTS 57-184430 11/1982 Japan .

*Primary Examiner*—Joseph L. Schofer
*Assistant Examiner*—Jeffrey T. Smith
*Attorney, Agent, or Firm*—Klauber & Jackson

[57] ABSTRACT

A method is described for forming bulked aggregates of mineral particles such as kaolins. An aqueous slurry of the mineral is treated with a source of a multi-valent cation to floc the mineral, polyacrylic is added and the slurry is then neutralized with a base to an alkaline pH. This treatment causes the polyacrylic acid to undergo cross-linking with the cations to form the polyacrylate which precipitates in situ on the mineral floc and preserves and retains the bulked, porous floc structure, whereby pore radius and volume of the treated mineral are increased. The products are useful as fillers or as coating pigments in paper manufacture.

16 Claims, 2 Drawing Sheets

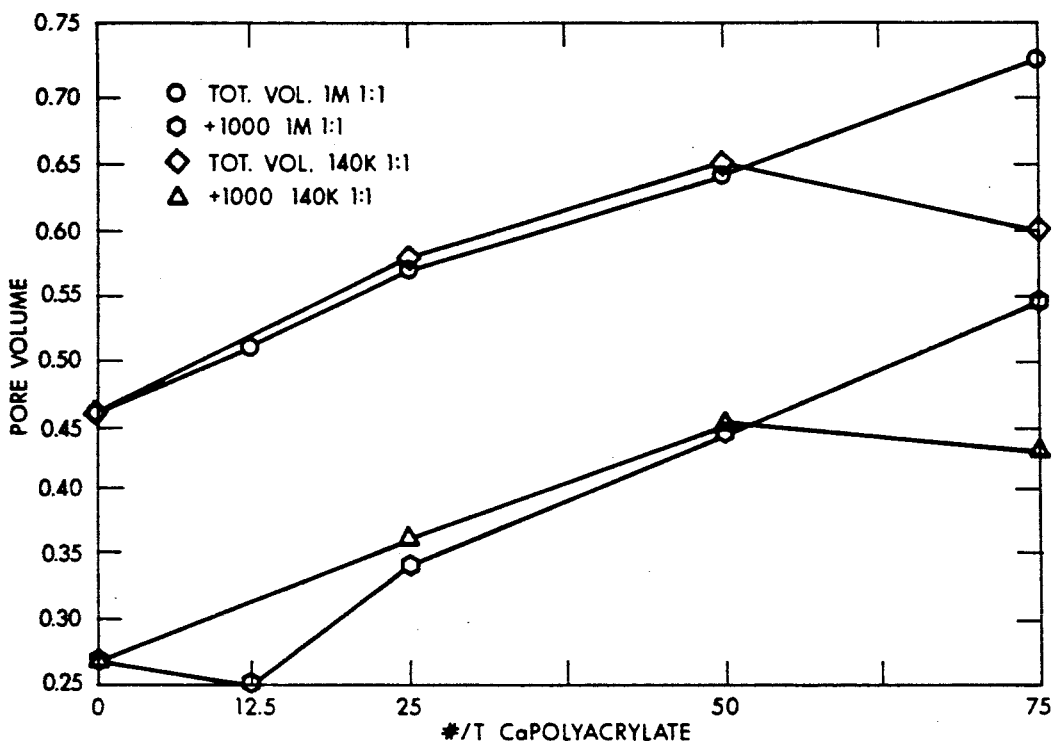
FIGURE 3 EFFECT OF #/T ADDITION CaPOLYACRYLATE
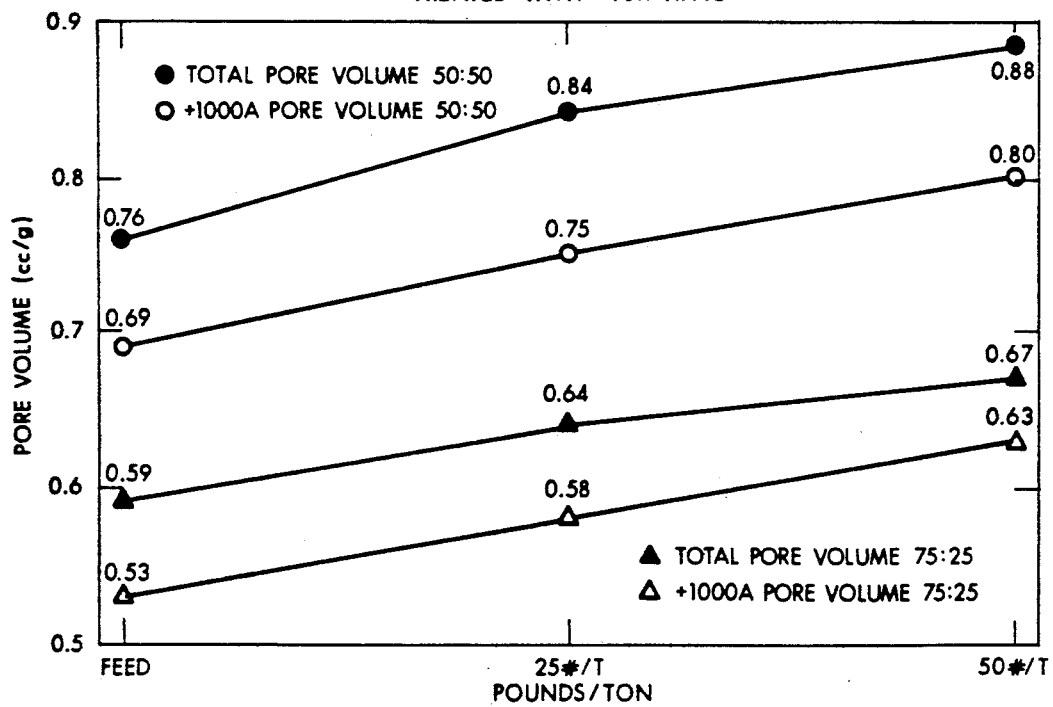
FIGURE 4 CALCIUM CARBONATE/CALCINED CLAY 50:50 AND 75:25 TREATED WITH 140K HPAC ive calcination and subsequent beneficiation steps. Thus, calcining uses considerable quantities of energy; and the calcined pigment product emerging from the calciner is an agglomerated mass, which commonly needs to be pulverized and further processed to provide a useful filler or coating product.

CHEMICALLY AGGREGATED MINERAL PIGMENTS

FIELD OF THE INVENTION

This invention relates generally to mineral products and more specifically relates to a structured mineral pigment, especially a kaolin pigment, and methods of manufacture of same. The pigment is useful as a filler in paper products and enables preparation of paper coating formulations which yield resultant coated paper products of surprisingly enhanced properties.

BACKGROUND OF THE INVENTION

In the course of manufacturing paper and similar products, including paperboard and the like, it is well known to incorporate quantities of inorganic materials into the fibrous web in order to improve the quality of the resulting product. In the absence of such "fillers" the resulting paper can have a relatively poor texture due to discontinuities in the fibrous web. The said fillers are also important in improving the printing qualities of the paper, i.e. by improving the surface characteristics of same. The use of appropriate such fillers, further, vastly improves the opacity and the brightness of a paper sheet of a given weight.

A number of inorganic materials have long been known to be effective for many of the aforementioned purposes. Among the best of these materials is titanium dioxide, which can be incorporated into the paper in the form of anatase or of rutile. Titanium dioxide, however, is among the most expensive materials which are so useable. Thus despite the effectiveness of such material as a filler, its use is limited and satisfactory replacements have been much sought after.

Among the materials which have found increasing acceptance as paper fillers are calcined kaolins. Materials of this type are generally prepared by calcining a crude kaolin which may have been initially subjected to prior beneficiation steps in order to remove certain impurities, e.g. for the purpose of improving brightness in the ultimate product. Reference may usefully be had to Proctor. U.S. Pat. No. 3,014,836, and to Fanselow et al, U.S. Pat. No. 3,586,823, which disclosures are representative of the prior art pertinent to calcined kaolins.

Those properties which render a kaolin pigment particularly valuable for use as a filler are also well known. These include a low abrasion value, and high brightness and opacifying characteristics. The low abrasion is significant in order to assure that the resultant paper product may be manufactured and processed using conventional machinery without damaging same. The brightness and opacifying characteristics are important in producing an acceptable paper sheet, one which incorporates whiteness, high opacity, good printability, and light weight.

Both the brightness characteristics of the given kaolin and the opacifying properties of same when incorporated as a filler in paper, may be quantitatively related to a property of the filler identified as the "scattering coefficient S". The said parameter, i.e. the scattering coefficient S of a given filler pigment, is a property well known and extensively utilized in the paper technology art, and has been the subject of numerous technical papers and the like. The early exposition of such measurements was made by Kubelka and Munk, and is reported in Z. Tech. Physik 12:539(1931). Further citations to the applicable measurement techniques and detailed definitions of the said scattering coefficient are set forth at numerous places in the patent and technical literature. Reference may usefully be had in this connection, e.g. to U.S. Pat. Nos. 4,026,726 and 4,028,173. In addition to the citations set forth in these patents, reference may further be had to Pulp and Paper Science Technology, Vol. 2 "Paper", Chapter 3, by H.C. Schwalbe (McGraw-Hill Book Company, N.Y.)

In order to obtain high light scattering and opacity the major portion of filler should be in the range of one micrometer. However, good light scatter cannot be achieved solely by using a kaolin having the said size characteristics: an essential further characteristic needed is that the kaolin be structured, i.e. formed from an assemblage of platelets interconnected or bonded to provide aggregates which include a network of the platelets.

Aggregation can be of interest for additional reasons. In particular, many kaolin crude reserves are considerably finer than preferred by the paper industry; i.e. they have an unduly high proportion of particles with E.S.D.'s below 0.25 micrometers. Typical Cretaceous kaolins, e.g. include 25 to 30% by weight of particles below 0.25 micrometers; and typical Tertiary kaolins can include 50 to 60% by weight of particles below 0.25 micrometers E.S.D. (equivalent spherical diameter).

One method for achieving aggregation is to utilize calcining. Thus, in U.S. Pat. No. 4,381,948 to A.D. McConnell et al, a calcined kaolin pigment and a method for manufacture of same are disclosed. The said pigment consists of porous aggregates of kaolin platelets, and exhibits exceptionally high light scattering characteristics when incorporated as a filler in paper. This pigment, which substantially corresponds to the commercially available product ALPHATEX ® of the present assignee, E.C.C. America, Inc. (Atlanta, Ga.), is prepared by first blunging and dispersing an appropriate crude kaolin to form an aqueous dispersion of same. The blunged and dispersed aqueous slurry is subjected to a particle size separation from which there is recovered a slurry of the clay which includes a very fine particle size; e.g., substantially all particles can be smaller than 1 micrometer E.S.D. The slurry is dried to produce a relatively moisture-free clay, which is then thoroughly pulverized to break up agglomerates. This material is then used as a feed to a calciner; such feed is calcined under carefully controlled conditions to typical temperatures of at least 900° C. The resulting product is cooled and pulverized to provide a pigment of the porous, high light scattering aggregates of kaolin platelets as described.

Calcined kaolins have also found use in paper coating applications. Reference may be had to the paper by Hollingsworth, Jones, and Bonney, "The Effect of Calcined Clays on the Printability of Coated Rotogravure and Offset Printing Papers", TAPPI Proceedings, pages 9–16, 1983 Coating Conference, discussing the advantages of incorporating small quantities of calcined kaolins into conventional kaolin-based coating formulations. Brightness and opacity of the paper both increase with increased calcined kaolin content, as may be expected from a pigment with high light scatter, and in some formulations gloss may show a slight increase with increasing calcined kaolin content.

Calcined kaolin products, including those of the aforementioned ALPHATEX ® type, are seen to be manufactured by relatively complex techniques involving a multiplicity of steps, including specifically a calcining step, plus various preparatory steps and post-calcining steps. Thus, the said product is relatively expensive to produce; and requires considerable investment in complex apparatus and the like—e.g. highly regulated calciners, etc. It can indeed be noted that the conditions of preparation of these materials must be very carefully controlled in order to keep abrasion acceptably low in the calcined product. For example, the calcination operation tends per se to produce an abrasive product—in consequence of overheating—if great care is not taken to preclude such result.

It is further to be noted that in order to produce a low abrasion calcined product, the particle size in the feed to the calciner must be carefully controlled—even a relatively small increase in coarseness of such feed can have very marked detrimental effect on abrasion characteristics.

It has heretofore been known to utilize uncalcined (sometimes referred to as "hydrous") kaolin both as paper fillers and for paper coating. Because the uncalcined material usually does not possess high light scattering qualities or good opacity, its usefulness, especially as a filler, is limited; and this (in addition to improving brightness) is indeed the particular advantage of calcined products of the ALPHATEX ® type; i.e. by virtue of the aggregated structures of same, high light scattering properties are provided and good opacity.

With respect further to terminology, it is noted that the prior art literature, including numerous of the prior art patents relating to the field of kaolin products and processing, often uses the term "hydrous" to refer to a kaolin which has not been subjected to calcination—more specifically, which has not been subjected to temperatures above about 450° C., which temperatures serve to alter the basic crystal structure of kaolin. These so-called "hydrous" clays may have been produced from crude kaolins, which have been subjected to beneficiation, as, for example, to froth flotation, to magnetic separation, to mechanical delamination, grinding or similar comminution, but not to the mentioned heating as would impair the crystal structure.

In an accurate technical sense, the description of these materials as "hydrous" is, however, incorrect. More specifically, there is no molecular water actually present in the kaolinite structure. Thus, although the composition can be (and often is) arbitrarily written in the form $2H_2O.Al_2O_3.2SiO_2$, it is now well-known that kaolinite is an aluminum hydroxide silicate of approximate composition $Al_2(OH)_4Si_2O_5$ (which equates to the hydrated formula just cited). Once the kaolin is subjected to calcination, which, for the purposes of this specification means being subjected to heating of 450° C. or higher for a period which eliminates the hydroxyl groups, the crystalline structure of the kaolinite is destroyed. Therefore, such material, having been thus calcined, cannot correctly be referred to as a "kaolin". Accordingly, it should be appreciated that henceforth in this specification, when the term "kaolin" or "kaolinite" is utilized, such term necessarily implies that the original structure of the material is intact. Thus, the term "kaolin" as used herein, can be considered to be equivalent to the technically inaccurate (but oft-occurring) prior art usage, "hydrous kaolin" or sometimes simply "hydrous clay."

From time to time it has been proposed to provide structured kaolin agglomerates by methods unrelated to calcining, the objective being to produce a high light scattering pigment, one with good opacifying properties, without the need for calcination.

Thus, in U.S. Pat. No. 4,346,178 to Peter Economou, a structured kaolin agglomerate is disclosed wherein the clay platelets are stabilized or frozen in position by the addition thereto of a urea-formaldehyde prepolymer.

Further relevant art includes U.S. Pat. No. 4,072,537 to F.L. Kurrle. Disclosed therein is a composite silicate pigment prepared by a precipitation reaction employing an aqueous suspension of clay particles wherein spherical hydrous metal silicate particles are precipitated on the planar surfaces of clay particles having a platelet-type structure. The metal silicate pigment component is comprised of the reaction product of a water soluble alkali metal silicate such as sodium silicate and water soluble salt of a polyvalent metal, such as calcium chloride.

As disclosed in U.S. Pat. No. 4,820,554 to J.P.E. Jones et al, a fine particle size kaolin feed is reacted in particulate form with a metal chloride, such as silicon tetrachloride, to form a chemically aggregated structured kaolin pigment. Thus, the aggregation of fine kaolinite is caused to occur when treated with silicon tetrachloride. These micron size, bulky aggregates are used to improve the surface properties of coated paper and the opacity of filled paper.

Polyacrylate alkali metal salts are known as dispersants for clays, e.g., kaolin. Sodium polyacrylate is a common dispersant, frequently used in the refining-/working up of the crude material. However, polyacrylate salts have not been disclosed as useful in the aggregation of clay particles.

U.S. Pat. No. 4,775,420 assigned to Coatex, S.A., describes a pigment composition for the coating of paper comprising a dispersion of an aqueous phase, a pigment or mixture of pigments such as kaolin, titanium oxide and calcium carbonate, and a dispersing agent comprised of carboxyl-containing polymers, e.g., an acrylic polymer, at least 60% of which is converted to the salt form with a polyvalent cation and if desired the balance may be converted with a monovalent cation such as sodium, ammonium and quaternary amine cations. Typically the dispersing agent is a calcium/sodium polyacrylate, see Test 34, column 12, lines 58–62. There is no teaching of aggregation of particulates.

Japanese Kokai Patent No. SHO 57(1982)-184430 discloses a high-concentration, low-viscosity aqueous dispersion of calcium carbonate comprising carbonates of different particle size range, a polycarboxylic acid type polymer such as an acrylic acid polymer and an inorganic electrolyte. A binder may be present such as starch. The electrolyte is selected from the group consisting of the hydroxides, chlorides, sulfates and phosphates of calcium, zinc and magnesium. The inventors found that if two kinds of microscopic calcium carbonate particles with specific and uniform particle sizes and shapes and with sizes different from each other but with a specific relationship, were blended in a specific proportion and compounded with constant amounts of a certain kind of dispersant and inorganic electrolyte, the packing density of the calcium carbonate particles was increased, and it was possible to provide a high concentration, low viscosity aqueous dispersion thereof.

In accordance with the foregoing, it may be regarded as an object of the present invention, to provide a structured kaolin pigment product, which possesses improved light scattering characteristics, and hence is useful as an opacifier and light scattering filler for paper and paper products, and which may similarly be used in other paper manufacturing applications, including in the coating of same.

It is also an object of the invention to provide improved coated paper and paperboard products for printing purposes such as for offset printing, gravure printing and other types of printing, using a structured kaolin pigment.

It is a further object of the present invention, to provide a pigment product of the foregoing character, which is prepared without calcination and therefore without subjecting the kaolin to high temperatures, and which accordingly possesses low abrasiveness in accordance with the kaolin feed from which it is produced.

It is a yet further object of the invention, to provide a pigmentary product of the foregoing character, which is composed of structured aggregates of minute kaolin particles which are bonded together chemically, i.e. without the use of calcination or other high temperature techniques.

It is a still further object of the invention to provide a high light scattering pigmentary kaolin product, which may be produced at lower costs than calcined kaolins, and which can therefore provide a lower cost replacement for many applications in which calcined kaolin products or other high cost fillers are presently utilized.

It is a yet further object of the invention, to provide a process for producing a pigmentary high light scattering kaolin product, which process utilizes chemical aggregation techniques, and may be carried out without the use of a calcining step or of other high temperature processing conditions or equipment.

It is a yet further object of the present invention, to provide a process for producing structured kaolin pigments as aforementioned, which consists of a minimal number of simply conducted steps, which utilize relatively simple and inexpensive apparatus.

A yet further object of the invention, is to provide a process as aforementioned, which enables low abrasion structured kaolin pigments to be produced from coarser process feeds than can normally be employed in calcination to produce a product of comparable low abrasion.

It is a further object of the invention to provide bulky structured kaolin pigments which are eminently suitable for paper coating applications.

Another object of the invention is to produce aggregated, bulked pigments which have increased pore radius and pore volume as compared with the feed material. It is known that the pores of a pigment contribute to light scatter in paper treating formulations.

SUMMARY OF THE INVENTION

The invention comprises the production of chemically aggregated bulking pigments through the cross-linking of anionic polymers with multi-valent cations on a clay surface, forming insoluble, cross-linked polymers. The anionic polymers used may have an average molecular weight range of from 5K to 1M, where K=thousand and M=million; the multi-valent cations will typically comprise $Ca^{2+}$, $Al^{3+}$, $Mg^{2+}$, $Cr^{2+}$, etc. This procedure increases the light scatter of these pigments in paper coating formulations by creating aggregates of increased average pore radius and volume in comparison to the feed particles. The process of the invention is surface nonspecific, and can be used to aggregate and bulk any negatively charged mineral particles which have acid to neutral pH characteristics, including e.g. kaolins, calcium carbonates (ground or chemically precipitated), $TiO_2$, and combinations of these.

According to the one aspect of the invention, a clay such as kaolin is slurried in water and a source of a polyvalent metal, such as $CaCl_2$, is added which flocs the clay in the slurry. Polyacrylic acid (HPAC) is added to an acidic pH preferably in the range of about 3 to 5 and the pH is gradually raised to an alkaline pH preferably in the range of about 8-9.5. At the acid pH both the cation and the polyacrylic acid are soluble in the clay/water slurry. Upon increasing the pH, the HPAC cross-links with the polyvalent cations which causes the polyacrylate, e.g., calcium polyacrylate (CaPAC) to precipitate in situ on the clay floc that has been formed; the calcium polyacrylate stabilizes the clay floc, acting as a "glue" to preserve the bulked, porous floc structure, whereby the pore volume and radius of the treated clay are increased.

Variations of the above method may be employed. For example, since particulate calcium carbonate is often used together with kaolin to increase brightness, combinations of for example up to 75 weight % (and more preferably up to about 50 weight %) calcium carbonate of the total mixture may be employed without sacrificing the advantages of the invention. This pigment is useful as a filler in paper making. Preremoval of fines from the kaolin feed increases the effectiveness of the CaPAC glue and further increases light scatter. This pigment has application as a filler or a coating pigment.

Thus, calcium polyacrylates have been successfully cross-linked (precipitated) on kaolin surfaces to produce pigments with increased pore volume and light scatter. Results indicate that a pigment with an approximately 600 normalized scattering coefficient can be produced from a kaolin feed treated with 50 lbs/ton of CaPAC. Similar results were obtained with calcium carbonate/kaolin mixtures. Treatment of these materials with 75 to 100 lbs./ton CaPAC produced pigments with pore volumes similar to commercially available calcined kaolin pigments, but with Breunig abrasions similar to hydrous kaolins.

BRIEF DESCRIPTION OF THE DRAWINGS

In the drawings appended hereto:

FIG. 3 is a further graphical plot, showing the effect of increasing dosage of calcium polyacrylate on pore volume of a 50—50 parts mixture of kaolin and calcium carbonate, and comparing products where the calcium polyacrylate is made respectively from polyacrylic acid of approximate molecular weights 140K and 1M; and FIG. 4 is a further graphical plot, showing pore volume for two different carbonate/kaolin feed mixtures treated with calcium polyacrylate pursuant to the invention.

DETAILED DESCRIPTION

Figure 1:
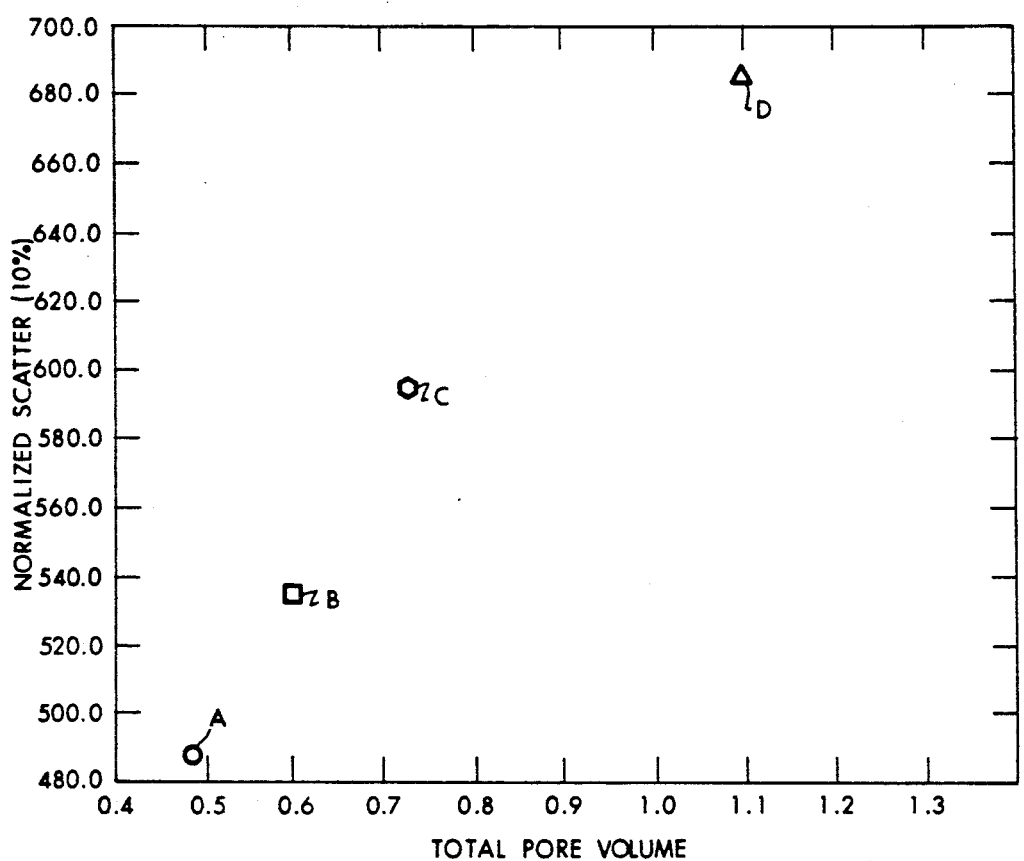
FIG. 1 is a plot of normalized light scatter and total pore volume, for several products prepared in accordance with the invention, and for control samples.

In a typical procedure for the production of cross-linked polyacrylates in situ on kaolin particles to effect aggregation thereof, an aqueous slurry of a refined and classified kaolin feed is prepared, and the slurry is mixed with $CaCl_2$ to floc the clay. Polyacrylic acid of a suitable molecular weight range is added with stirring. Thereupon, the slurry is neutralized by addition of NH4OH, or any other base (i.e. NaOH), e.g., to a pH of approximately 7 to 9, while mixing for a period of from 1 to 10 minutes. This brings about cross-linking of the polyacrylic acid with the polyvalent cation to cause the polyacrylate salt of the cation to precipitate in situ on the clay floc, forming aggregates having a bulked, porous structure. The slurry is then subjected to spray drying, or alternatively, to filtering and oven drying, to produce the final product.

Similar procedures may be used where other mineral particles are treated by the invention.

The invention is further illustrated by the following Examples, which are, however, to be considered illustrative and not delimitive of the invention otherwise set forth:

EXAMPLE I

In this Example, a feed kaolin material was utilized which was prepared from a fine particle size crude kaolin of the type sometimes referred to as a "hard" kaolin. The crude kaolin had an initial G.E. brightness of 88.2 and a particle size distribution such that at least 60% by weight of the particles have an equivalent spherical diameter (E.S.D.) of less than ¼ micrometers ($\mu$). The crude was rendered into a feed suitable for use in the present invention by blunging same, dispersing same as an aqueous slurry with 5 lbs/ton (of dry clay) of sodium polyacrylate, and adjusting the pH to approximately 9.0 with ammonium hydroxide. The slurry was then classified to 98% less than $2\mu$ by weight, and subjected to further beneficiation by being passed through a magnetic separator. The magneted slurry was then bleached with 10 lbs/ton of sodium hydrosulfite and filtered. The filter cake was redispersed and spray-dried to provide a feed suitable for use in the process of the invention. The resulting feed had a brightness of 88.2 on the G.E. scale, a particle size distribution of 98% less than $2\mu$, and 94% less than $1\mu$ and a Breunig abrasion of 14.4. Brightness values in the present specification are obtained according to the standard specification established by TAPPI procedure T-646 os-75.

The said feed was slurried at 25% solids, and was treated with 100 lbs/ton of calcium chloride and stirred for about 10 minutes, after which 50 lbs/ton polyacrylic acid having an average molecular weight of approximately 250 K was added and the slurry was stirred for about 30 minutes. The slurry was then neutralized with ammonium hydroxide to a pH of 8.2 and mixed for 10 minutes, double filtered and thereafter was spray-dried. The process effected aggregation of the feed kaolin to yield a product having in one run a G.E. brightness of 88.7. The Breunig abrasion for this product was 15.5. The procedure for determining Breunig abrasion is set forth at Table II of U.S. Pat. No. 4,678,517—the disclosure of said Table II is incorporated herein by reference.

EXAMPLE II

In this Example the feed utilized was substantially the calciner feed used in preparing the ALPHATEX ® product of the present assignee, which feed is described in the aforementioned U.S. Pat. No. 4,381,948.

200 g of this feed was slurried in 450 ml of water, followed by the addition of CaCl2.2H2O at a doseage rate of 100 lbs/ton (dry clay), which flocced the clay in the slurry. Polyacrylic acid of approximately 250,000 molecular weight was then added (50 lbs/ton) to the system. At the then pH of 3.5, both $Ca^{2+}$ and the polyacrylic acid were soluble in the clay/water slurry. The pH of the system was then raised slowly by addition of NH4OH, which caused calcium polyacrylate to precipitate and to stabilize the clay floc. The slurry was filtered and the clay product recovered, dried, and examined. The procedure set forth had increased the pore radius and volume of the feed from 800Å and 0.52cm$^3$/g to 1200Å and 0.64 cm$^3$/g for the treated clay. Procedures for determining pore radius and pore volume, are set forth in S. Lowel and J. Shield, *Powder Surface Area and Porosity*, published by Chapman & Hall.

EXAMPLE III

A beneficiated cream Georgia kaolin clay was used as the feed in this Example. Such feed was slurried and otherwise treated as in Example I. The pore radius and volume of the resulting calcium polyacrylate-treated clay had increased (in comparison to the feed) from 725Å and 0.48 cm$^3$/g to 975 Å and 0.59 cm$^3$/g.

EXAMPLE IV

In this Example, a feed kaolin as in Example I was utilized in the process of the invention, with normalized scatter and total pore volume being shown in FIG. 1 for several resulting products, where somewhat differing process conditions are used. In particular, the data marked "A" is for the kaolin feed prepared as in Example I. Data "B" was yielded for products prepared as in Example I, except that the calcium chloride was added to the slurry using a low shear mixer. Oven drying was at 80° C. for 12 hours. The processing for product "C" was similar to "B", except that the slurry was subjected to high shear mixing and spray drying, and was also then subjected to multiple milling in a Micropulverizer. The data "D" is a control, and is for the aforementioned ALPHATEX ® calcined clay. The procedure for measuring normalized scatter is set forth in detail at Example II of U.S. Pat. No. 4,820,554, the disclosure of which is incorporated by reference herein. This also explains how the 10% loading is accomplished.

EXAMPLE V

Figure 2:
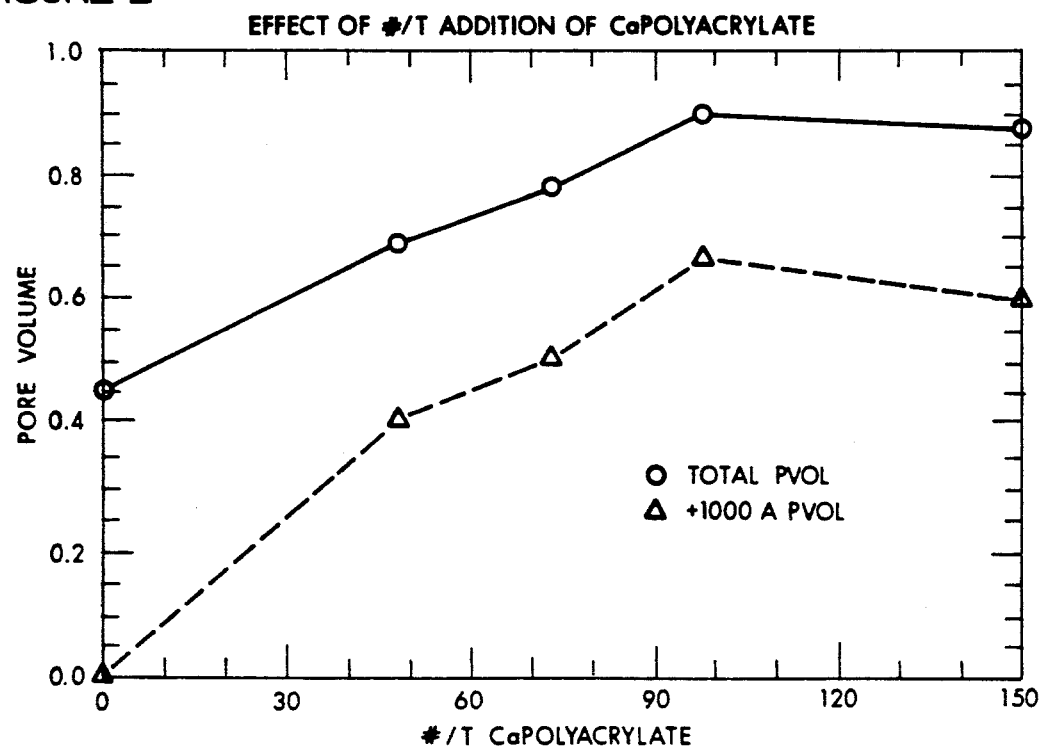
FIG. 2 is a plot, depicting the effect of increasing dosage of calcium polyacrylate on the pore volume of the resultant aggregated kaolin products.

In FIG. 2, the effect of varying the dosage of the calcium polyacrylate on the pore volume for the product is set forth. In this instance, the feed utilized corresponds to that of Example I. The procedure for preparing the products of the invention are in accordance with Example I. The Figure illustrates the effect on pore volume of the amount of calcium polyacrylate effectively added per ton of dry clay.

EXAMPLE VI

In FIG. 3, similar data to that of FIG. 2 appears, i.e., pore volume as a function of the effective quantity of calcium polyacrylate added. The feed in this Example, however, was a 50:50 parts by weight blend of the kaolin feed of Example I with a particulate calcium carbonate. The particulate calcium carbonate used was the CARBITAL 90 ® product of Atlantic Carbonates of Baltimore, Md. This product has a particle size distribution such that 90% thereof by weight is of less than $2\mu$ ESD (equivalent spherical diameter). The resultant data is shown for two different molecular weights of HPAC, viz. for an approximately 140 K HPAC and an approximately 1 M molecular weight HPAC.

EXAMPLE VII

In the data shown in FIG. 4, the feeds treated by the invention were mixtures of particulate calcium carbonate and the aforementioned calcined kaolin product ALPHATEX®. The calcium carbonate was the OPACIMITE® product of the present assignee, which is a ground carbonate having an approximate P.S.D. of 100%<5μ; 85%<2μ; 50%<1μ; 15%<½μ; and approximate 2 5%<¼μ. The procedure for preparing the products was in accordance with Example I. Total pore volume and over 1000Å pore volume are shown for treatment with HPAC of approximately 140K molecular weight, at 0, 25 lbs/ton and 50 lbs/ton treatment levels.

EXAMPLE VIII

In this example the feed kaolin was the same as that described in Example I, and the feed was similarly processed. The effective quantity of calcium polyacrylate used was 75 lbs/ton, except that for different samples the molecular weight of the HPAC was different. The effects of these variations in the said molecular weight will be seen in Table 1 below:

TABLE 1
EFFECT OF MOLECULAR WEIGHT ON THE PORE VOLUME AND RADIUS OF A KAOLIN FEED TREATED WITH 75 lb/ton CALCIUM POLYACRYLATE

| Molecular Weight | Pore Volume (cc/g) | Pore Radius Å |
|---|---|---|
| 1 million | 0.79 | 2050 |
| 276,000 | 0.78 | 2000 |
| 60,000 | 0.80 | 2500 |
| 5,000 | 0.62 | 1500 |
| Feed | 0.44 | 720 |

To be noted is that HPAC with as low as a 5,000 molecular weight will bulk the feed material, but it is not as effective as the 60 K-1 M range.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A process for forming chemically aggregated bulking pigments for use in paper filling and coating formulations, which comprises forming an aqueous slurry of a feed material comprising negatively charged mineral particles which have acid to neutral pH characteristics; adding a source of a polyvalent cation to said slurry to floc the said particles; adding polyacrylic acid to an acidic pH and neutralizing with a base to an alkaline pH to cross-link the polyacrylic acid with the polyvalent cation to cause the polyacrylate salt of said cation to precipitate in situ on the mineral particle flocs to thereby form aggregates having a bulked, porous, floc structure; and recovering and drying the aggregates as product.

2. A process as set forth in claim 1 in which the source of polyvalent cation is an inorganic salt of a di- or tri-valent metal.

3. A process as set forth in claim 2 in which the inorganic salt is $CaCl_2$ and the polyacrylate salt is calcium polyacrylate.

4. A process as set forth in claim 3 in which the acidic pH is in the range of about 3 to 5 and the alkaline pH is in the range of about 8 to 9.5.

5. A process as set forth in claim 3 in which the mineral particles are selected from one or more members of the group consisting of kaolins, calcium carbonates, and titanium dioxide.

6. A process for forming high light scattering, low abrasion aggregates of kaolin clay particles for use in paper filling and coating formulations, which comprises forming an aqueous slurry of a feed kaolin; adding a source of a polyvalent cation to said slurry to floc the kaolin; adding polyacrylic acid to an acidic pH and neutralizing with a base to an alkaline pH to cross-link the polyacrylic acid with the polyvalent cation to cause the polyacrylate salt of said cation to precipitate in situ on the kaolin floc to thereby form aggregates having a bulked, porous, floc structure; and recovering and drying the aggregates as product.

7. A process as set forth in claim 6, in which the source of polyvalent cation is an inorganic salt of a di- or tri-valent metal.

8. A process as set forth in claim 7, in which the inorganic salt is $CaCl_2$ and the polyacrylate salt is calcium polyacrylate.

9. A process as set forth in claim 8, in which the acidic pH is in the range of about 3 to 5 and the alkaline pH is in the range of about 8 to 9.5.

10. A process as set forth in claim 8, in which calcium carbonate is admixed with the feed kaolin.

11. A process as set forth in claim 10, in which calcium carbonate is added up to about 75 weight % of the mixture.

12. A process as set forth in claim 10, in which calcium carbonate is added up to about 50 weight % of the mixture.

13. A process as set forth in claim 6 in which the feed kaolin has been classified to have a particle size distribution such that at least 94 by weight are of less than 1 micron E.S.D.

14. A process as set forth in claim 6 in which the feed kaolin is a hard kaolin.

15. A process as set forth in claim 6 in which the polyacrylic acid has an average molecular weight in the range from about 5 K to 1 M.

16. A process as set forth in claim 8 in which the equivalent amount of calcium polyacrylate in the product is in the range of from about 10 to 100 lbs/ton of the feed material.

* * * * *